(12) United States Patent
Kim

(10) Patent No.: US 10,988,225 B2
(45) Date of Patent: Apr. 27, 2021

(54) FLYING OBJECT WITH MULTI-PURPOSE LANDING GEAR MODULE

(71) Applicant: KOREA AEROSPACE RESEARCH INSTITUTE, Daejeon (KR)

(72) Inventor: Dong Min Kim, Daejeon (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 330 days.

(21) Appl. No.: 15/999,443

(22) Filed: Aug. 20, 2018

(65) Prior Publication Data

US 2019/0054993 A1    Feb. 21, 2019

(30) Foreign Application Priority Data

Aug. 18, 2017    (KR) .................. 10-2017-0104908

(51) Int. Cl.
| | | |
|---|---|---|
| B64B 1/00 | (2006.01) | |
| B64D 3/00 | (2006.01) | |
| B64F 3/00 | (2006.01) | |
| B64B 1/66 | (2006.01) | |
| B64F 1/14 | (2006.01) | |

(52) U.S. Cl.
CPC .............. *B64B 1/005* (2013.01); *B64B 1/66* (2013.01); *B64F 1/14* (2013.01); *B64F 3/00* (2013.01)

(58) Field of Classification Search
CPC .............. B64B 1/005; B64B 1/66; B64F 1/14
See application file for complete search history.

(56) References Cited

U.S. PATENT DOCUMENTS

| | | | | |
|---|---|---|---|---|
| 5,516,065 A | * | 5/1996 | Hagenlocher | B64B 1/005 244/115 |
| 2010/0038481 A1 | * | 2/2010 | Wood | B64F 1/14 244/116 |
| 2016/0075422 A1 | * | 3/2016 | Goldstein | B64C 39/024 244/30 |
| 2016/0122014 A1 | * | 5/2016 | Jang | G01C 21/005 244/25 |
| 2016/0347594 A1 | * | 12/2016 | Shmueli | B66D 1/7457 |
| 2017/0361946 A1 | * | 12/2017 | Von Zeppelin | G05D 1/021 |
| 2019/0152577 A1 | * | 5/2019 | Kim | B64B 1/58 |

FOREIGN PATENT DOCUMENTS

| | | | |
|---|---|---|---|
| JP | 2002234498 A | * | 8/2002 |
| JP | 2002234498 A | | 8/2002 |
| KR | 20030024138 A | | 3/2003 |
| KR | 101131748 B1 | | 4/2012 |
| KR | 101640362 B1 | | 7/2016 |
| KR | 101678164 B1 | | 11/2016 |

OTHER PUBLICATIONS

Korean Intellectual Property Office, Office Action Issued in Application No. 10-2017-0104908, dated Jan. 4, 2019, South Korea, 13 pages. (Submitted with Partial Translation).

* cited by examiner

*Primary Examiner* — Philip J Bonzell
*Assistant Examiner* — Tye William Abell
(74) *Attorney, Agent, or Firm* — McCoy Russell LLP

(57) ABSTRACT

A flying object with a landing gear module serving as a floating weight that can be used simultaneously with an airship and an aerial mooring type aerostat, and more particularly, a flying object capable of simultaneously allowing a landing gear to serve as a floating weight, thereby stably simplifying a mooring process of the flying object and manufacturing the flying object at low cost.

12 Claims, 10 Drawing Sheets

PRIOR ART

PRIOR ART

PRIOR ART

FIG. 4A
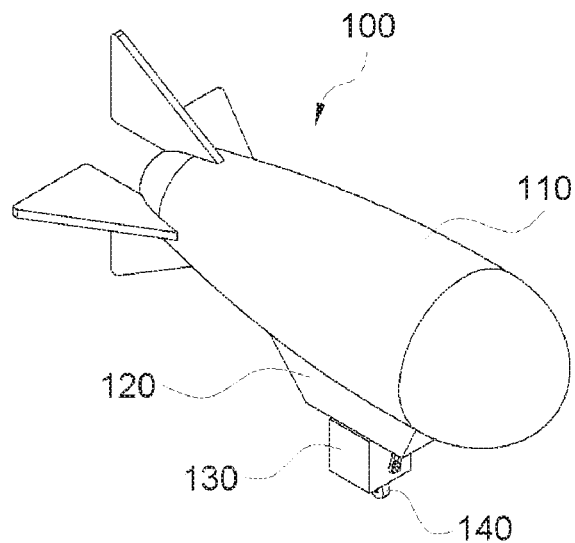
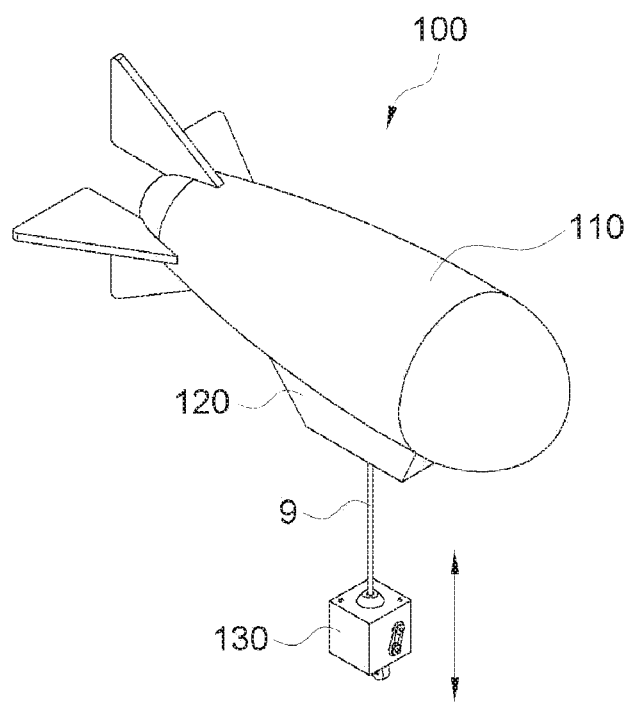
FIG. 4B

FLYING OBJECT WITH MULTI-PURPOSE LANDING GEAR MODULE

CROSS-REFERENCE TO RELATED APPLICATIONS

This application claims priority under 35 U.S.C. § 119 to Korean Patent Application No. 10-2017-0104908, filed on Aug. 18, 2017, in the Korean Intellectual Property Office, the disclosure of which is incorporated herein by reference in its entirety for all purposes.

TECHNICAL FIELD

The following disclosure relates to a flying object that can be simultaneously used as an airship and an aerial mooring type aerostat, and more particularly, to a flying object capable of allowing a landing gear module to simultaneously serve as a floating weight.

BACKGROUND

An airship refers to a flying object that mainly uses buoyancy but utilizes a propulsion device to move to a desired position so as to perform missions. An aerial mooring type aerostat refers to a flying object that is equipped with image devices, radars or other aviation sensors to perform surveillance, observation, communication relay and the like while being moored at high altitudes.

The aerial mooring type aerostat performs missions for 5 to 30 days while being moored at a height of several hundred meters to 4 km above the ground, and is equipped with several kg to several tons of equipment.

The aerial mooring type aerostat is classified into a small to medium sized aerostat and a medium to large sized aerostat. The small to medium sized aerostat can be movably installed, but there is a problem in that it takes half a day to more than a day in a process of injecting helium and assembling equipment at the time of installation after movement, the equipment cannot be assembled and installed in a severe weather with, for example, a wind velocity of 5 m/sec or more, and it is necessary to discharge the expensive helium during withdrawal of the equipment and therefore operating costs increase with the consumption of the helium.

On the other hand, there is a problem in that the medium to large sized aerostat cannot be movably installed, large land and heavy equipment are required for the installation of the aerostat, and it takes several days to assemble or install the equipment. Similar to the small to medium sized aerostat, there is a problem in that the equipment cannot be assembled and installed in severe weather.

In order to overcome these problems, conventionally, there has been proposed a flight body simultaneously performing the role of the airship and the role of the aerial mooring type aerostat by combining the airship with the aerostat.

A flying object shown in FIG. 1 is disclosed in Korean Patent No. 10-1678164 (Registered on Nov. 15, 2016). An airship-type flying object 1 including a landing module 6 and a propulsion module 7 has a floating weight 5 and a winder 4, and the flying object 1 is landed on the ground, moves to a desired mooring position using the propulsion module 7, and then is moored to the winder 4 to perform the missions, and the winder 4, the floating weight 5, and the propulsion module 7 are mounted on a gondola 3 attached to a lower portion of a gasbag 2.

FIG. 2 illustrates an operation mode of the conventional flying object. The conventional flying object 1 is normally moored on the ground using the landing module 6 equipped with wheels (L1), and then takes off by buoyancy and thrust of the gasbag 2 if being assigned missions and moves to the mooring position using the propulsion module 7 (L2). The mooring position is provided with a mooring winder 8, a mooring cable 9 wound around the winder 4 is lowered so that an end portion C1 of the mooring winder 8 is connected to an end portion C2 of the mooring winder 8 (L3) and then a length of the mooring cable 9 is adjusted using the mooring winder 8 to adjust the altitude of the aerostat. The buoyancy of the flying object 1 is larger than the full load as the floating weight 5 mounted in the gondola 3 is unloaded on the ground and the floating weight 5 is unloaded on the ground (refer to reference numeral 5a in FIG. 2), such that the mooring is smooth and stable.

FIG. 3 shows a method for unloading the floating weight 5 of the conventional flying object 1, and it is also possible to perform the unloading by adjusting water, sand, or the like provided in the flying object 1, in addition to the illustrated method.

The conventional floating weight 5 has a plurality of driving rollers 10 so as to be movable upward and downward along the mooring cable 9 during the unloading. The driving roller 10 moves the mooring cable 9 up and down while rotating by receiving the driving force from the driving motor 11 attached to the floating weight 5.

However, the conventional floating weight 5 is separately provided in the gondola 3 and needs to include separate unloading devices such as the driving roller 10 and the driving motor 11 and therefore has disadvantages of difficulty in manufacturing and high price.

In addition, when the unloading is performed, after the mooring cable 9 is connected to the end portion C2 of the mooring winder 8, the floating weight 5 is lowered and then the floating weight 5 is dismantled separately to be unloaded on the ground. Therefore, there is a problem in that the unloading process is complicated and an accident may occur due to the sliding of the driving roller 10 when the driving roller 10 of the floating weight 5 moves along the mooring cable 9 up and down.

SUMMARY

An embodiment of the present invention is directed to providing a landing gear module which is configured to not only serve as sliding and landing upon take off and landing of an airship, but also serve as a floating weight during floating for aerial mooring to stably and simply perform a mooring process of a flying object and manufacture the flying object at low cost.

In one general aspect, a flying object 100 with a landing gear module serving as a floating weight includes: a gasbag 110; a gondola 120 mounted on a lower part of the gasbag 110; and a landing module 130 mounted on the gondola 120, wherein the landing module 130 is spaced apart from the gondola 120 to be unloaded on the ground so as to serve as a floating weight upon aerial mooring.

The landing module 130 may include a winding drum 180 which winds the mooring cable 9 whose one end is connected to the gondola 120 and a driving motor 190 applying a rotational force thereto and when the winding drum 180 winds the mooring table 9, the landing module 130 may be loaded onto the gondola 120 and when the mooring cable 9 is unwound, the landing module 130 may be unloaded onto the ground.

The winding drum 180 and the driving motor 190 may be provided in the gondola 120 or the landing module 130.

The flying object may further include a speed reducer 191 provided between the driving motor 190 and the winding drum 180.

The flying object may further include a traverse 170 provided on a front end of the winding drum 180 and guiding the mooring cable 9 in a lateral direction to evenly wind the mooring cable 9.

The traverse 170 may move in a lateral direction by a conveying screw 171 passing through a central part of the traverse 170, the conveying screw 171 may have a shaft shape and include guide grooves 171a and 171b having a predetermined height which are provided on a surface thereof, guide protrusions provided on the traverse 170 may be inserted into the guide grooves 171a and 171b so that when the conveying screw 171 rotates, a rotational force of the conveying screw 171 may be converted into lateral movement energy of the traverse 170.

The flying object may further include a weight body 200 provided on a lower part of the landing module 130.

An upper part of the landing module 130 may be provided with a docking cone 150 as a drawing-in structure for drawing in and the landing module 130 may be inserted into a docking cone inserting portion 210 provided in the gondola 120 when being loaded on the gondola 120 so that the landing module 130 is loaded at a constant position at all times.

Docking guide protrusions 160 and 161 may be provided around the docking cone 150 above the landing module 130 and fitted into guide inserting portions 220 and 221 provided in the gondola 120 to constantly adjust a docking position and a docking direction.

The landing module 130 may be provided with buffering means 140 and 145 for absorbing shock on the ground upon landing.

In the buffering means, a wheel 140 may be mounted on a lower part of the landing module 130 via a wheel support arm 141.

The wheel support arm 141 may have a structure of absorbing shock when the flying object is landed on the ground.

The buffering means may be constituted by a buffer tank 145 which is mounted on the lower part of the landing module 130 and is made of an elastic material, and an inside of the buffer tank 145 may be filled with a buffering member.

The flying object may be moored by fixing the landing module 130 to the ground in a state in which the landing module 130 is unloaded on the ground.

Other features and aspects will be apparent from the following detailed description, the drawings, and the claims.

BRIEF DESCRIPTION OF THE DRAWINGS

FIGS. 4A and 4B are perspective views showing a flying object with a landing gear module serving as a floating weight according to the present invention.

DETAILED DESCRIPTION OF MAIN ELEMENTS

| | |
|---|---|
| 5: Floating weight | 7: Propulsion module |
| 8: Mooring winder | 9: Mooring cable |
| 100: Flying object | 110: Gasbag |
| 120: Gondola | 130: Landing gear module |
| 140: Wheel | 145: Buffer tank |
| 150: Docking cone | 160, 161: Docking guide protrusion |
| 170: Traverse | 171: Conveying screw |
| 172: Guide rail | 174: Guide roll |
| 180: Winding drum | 190: Driving motor |
| 200: Weight body | 210: Docking cone inserting portion |

DETAILED DESCRIPTION OF EMBODIMENTS

Exemplary embodiments of the present invention will be described in detail with reference to the accompanying drawings.

Figure 1:
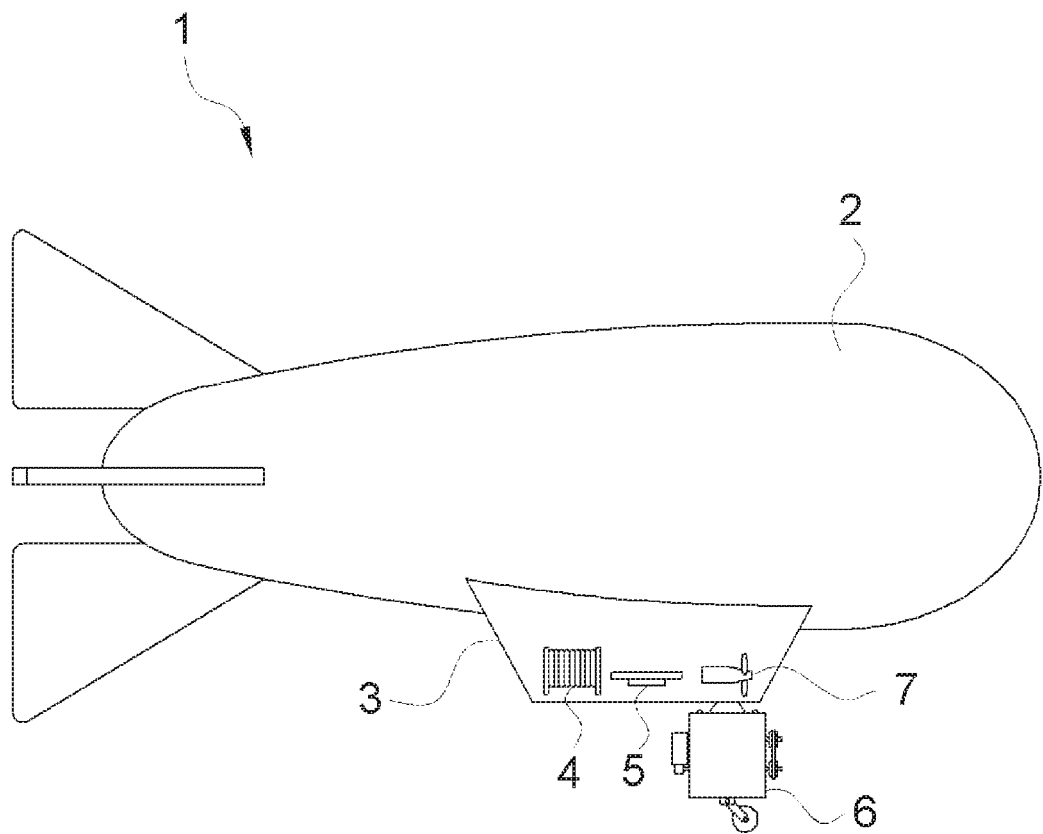
FIG. 1 is a schematic view showing the conventional aerial mooring type aerostat with a multi-purpose airship.
Figure 2:
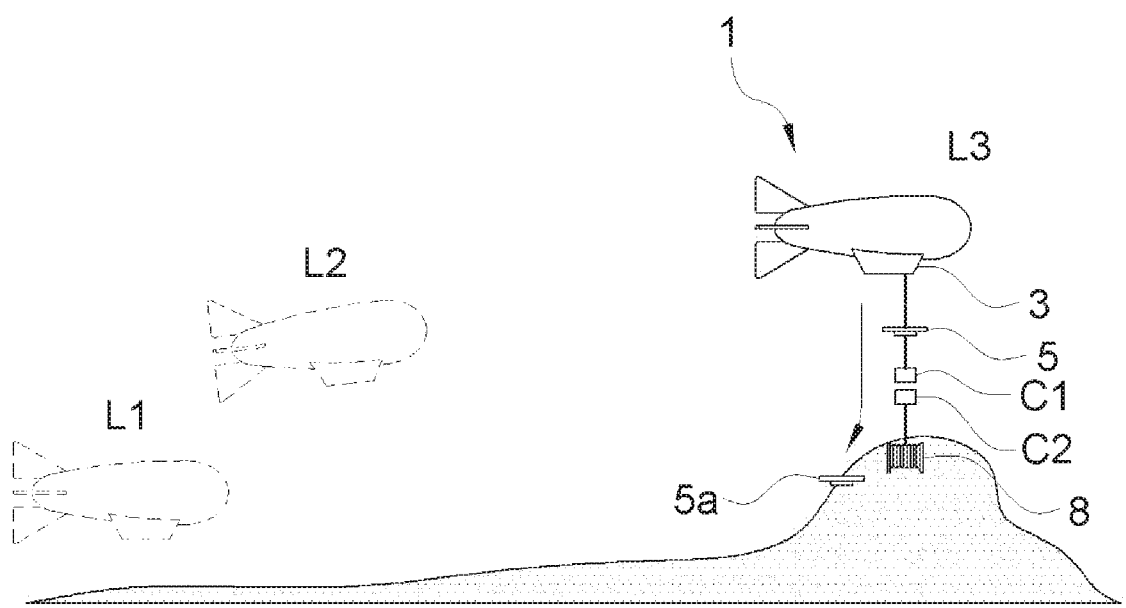
FIG. 2 is a schematic view showing a method for operating the conventional aerostat.
Figure 3:
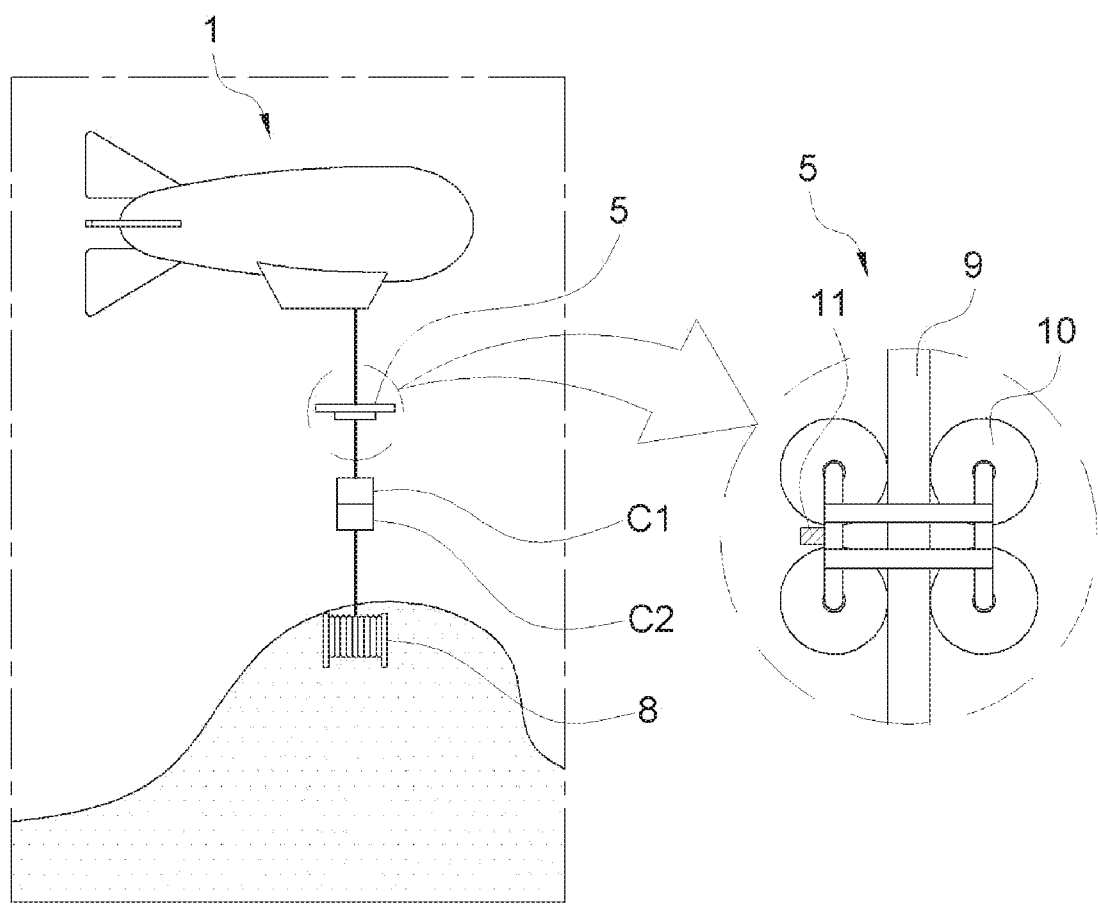
FIG. 3 is a conceptual diagram illustrating a process of allowing the conventional aerostat to unload a floating weight.
Figure 5:
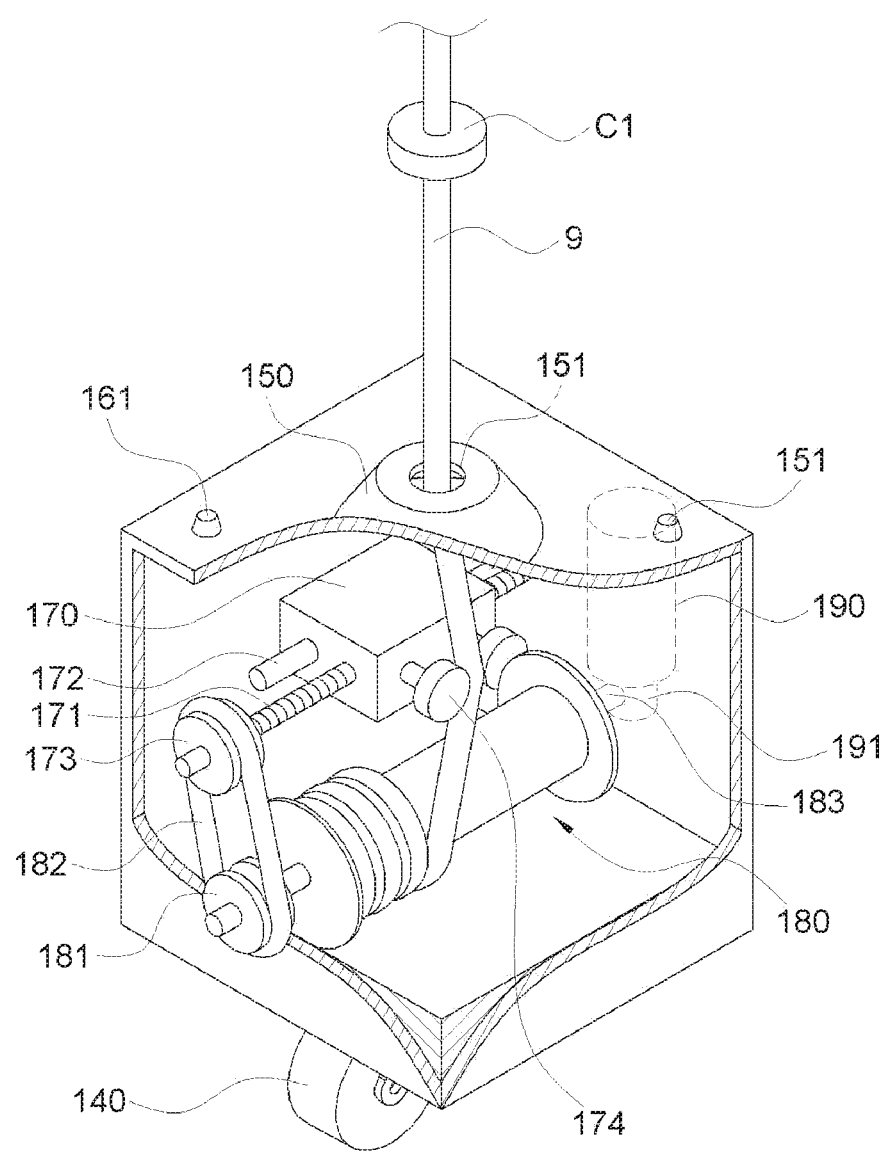
FIG. 5 is a schematic perspective view for explaining a landing module of the flying object with a landing gear module serving as a floating weight according to the present invention.
Figure 6:
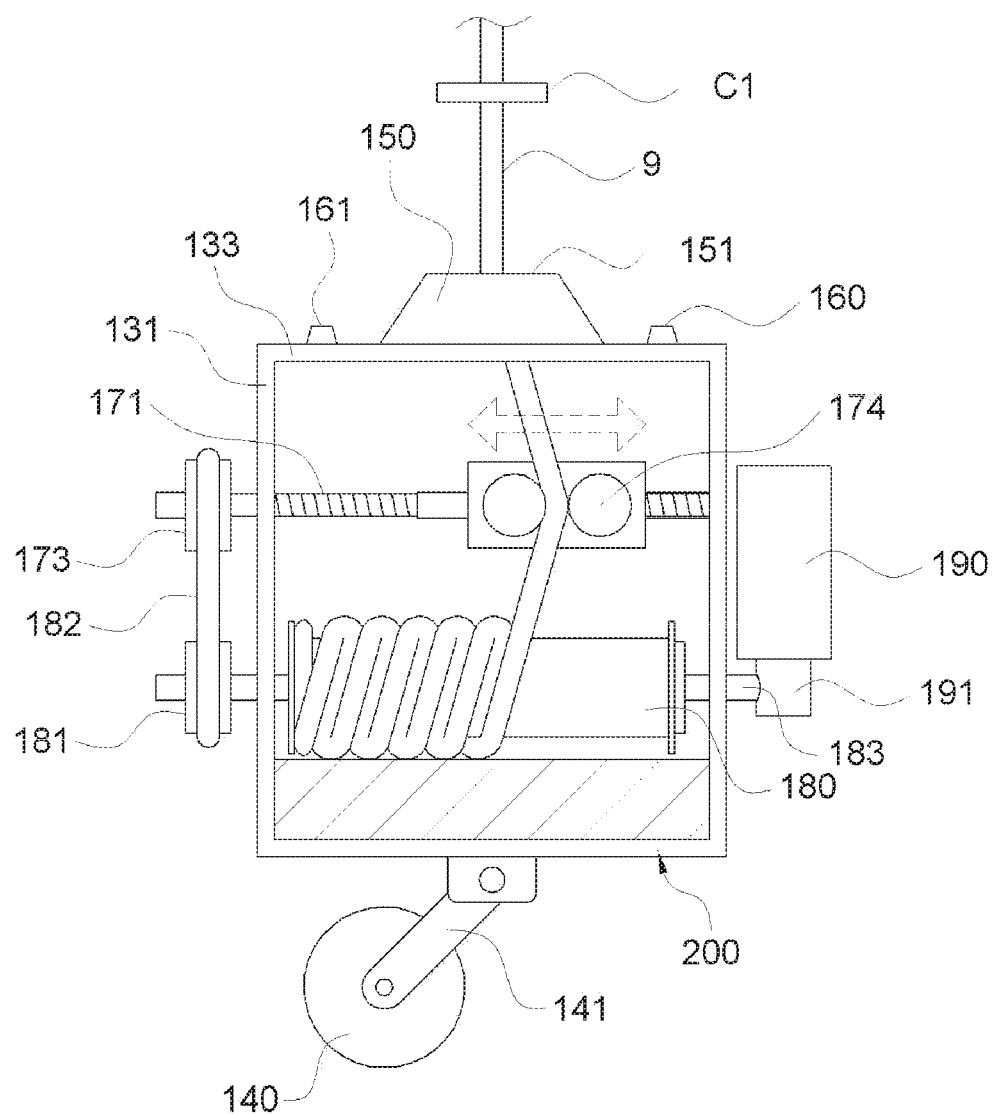
FIG. 6 is a front view of the landing module of the flying object with a landing gear module serving as a floating weight according to the present invention.

FIGS. 4A and 4B are perspective views showing a configuration of a flying object with a landing gear module serving as a floating weight according to the present invention, FIG. 5 is a schematic perspective view for explaining the landing module of the flying object with a landing gear module serving as a floating weight according to the present invention, and FIG. 6 is a front view of the landing module of the flying object with a landing gear module serving as a floating weight according to the present invention.

Figure 8:
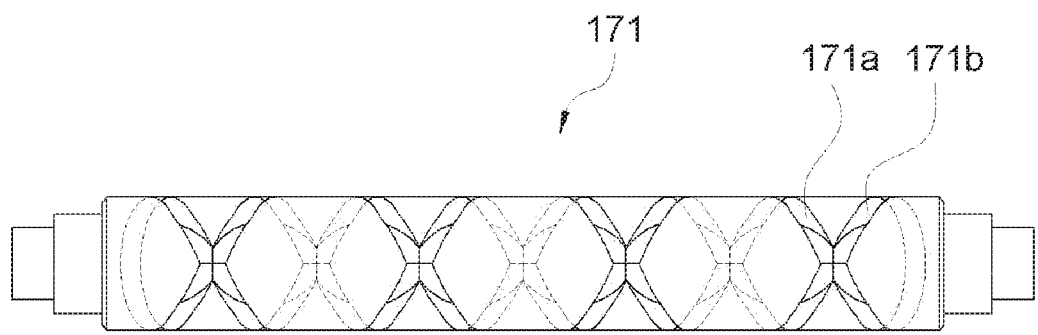
FIG. 8 is a front view showing a traverse conveying screw applied to the landing gear module serving as a floating weight according to the present invention.
Figure 9:
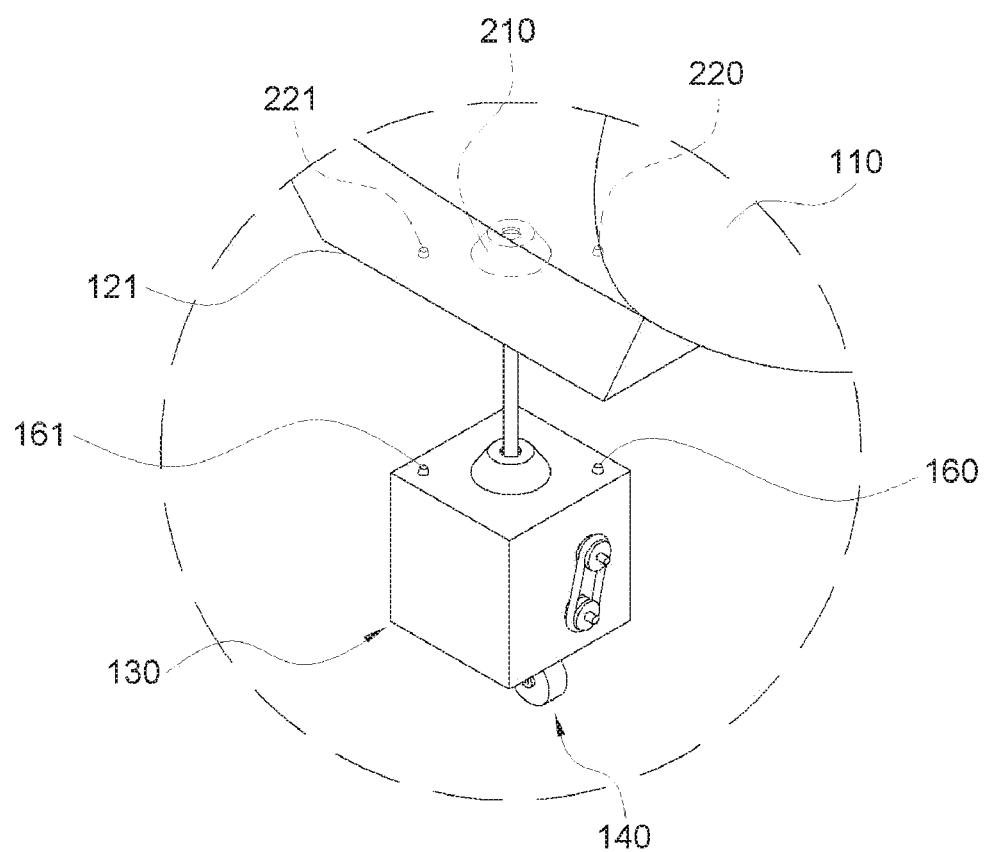
FIG. 9 is a schematic view showing a process of loading the landing gear module serving as a floating weight of the present invention.

FIG. 8 is a front view showing a traverse conveying screw applied to the flying object with a landing gear module serving as a floating weight according to the present invention and FIG. 9 is a schematic view showing a process of loading the landing gear module with a floating weight of the present invention.

Although matters not essential to understanding the technical idea of the invention as a part that is not different from the prior art are excluded from the description, the technical idea and scope of protection of the present invention are not limited thereto.

First, referring to FIGS. 4A and 4B, the flying object with a landing gear module serving as a floating weight according to the present invention will be described in detail.

A flying object 100 with a landing gear module serving as a floating weight according to the present invention includes: a gasbag 110; a gondola 120 mounted on a lower part of the gasbag 110; and a landing module 130 mounted on the gondola 120, in which the landing module 130 may be spaced apart from the gondola 120 to be unloaded on the ground.

The present embodiment describes that the landing module 130 is mounted on the gondola 120 so that the landing module 130 is unloaded on the ground. However, all the components of the gondola 120 or some of the components of the gondola 120 may be unloaded on the ground without the landing module while being spaced apart from the gasbag 110.

The landing module 130 is normally coupled to the gondola 120, and is used as a landing gear module when the flying object 100 is operated as an airship to move to a landing place and land on the ground.

To this end, buffering means 140 and 145 may be provided on a lower surface of the landing module 130. The buffering means 140 and 145 may be provided for shock absorption when the landing module 130 reaches the ground for landing.

For example, the landing module 130 includes a landing wheel 140. The wheel 140 is generally configured as a single wheel and is configured to mitigate the shock of the landing module 130 on the ground upon the landing. In addition, most loads are absorbed by a buoyancy of the gasbag 110 in a landing process, and the wheel 140 can be used to move the flying object 100 on the ground or moor the flying object 100 on open fields.

Figure 10:
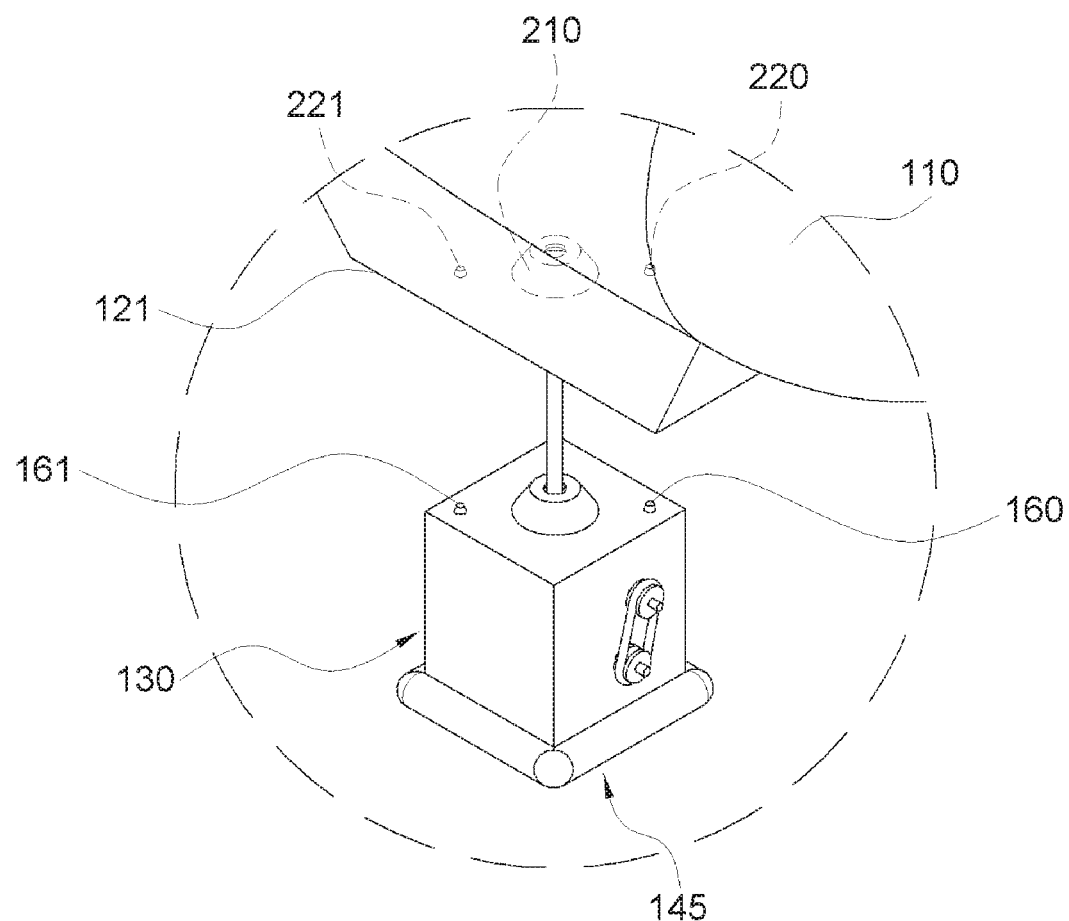
FIG. 10 is a schematic view showing the process of loading the landing gear module serving as a floating weight according to another exemplary embodiment of the present invention.

Referring to FIG. 10 as another example, the landing module 130 includes a buffer tank 145. The buffer tank 145 may be made of a rubber material having elasticity, and the inside of the buffer tank 145 may be hollow to be filled with water, sand or the like. The buffer tank 145 as described above is configured to mitigate the shock of the landing module 130 on the ground upon landing.

The landing module 130 is unloaded downward by the mooring cable 9 when being spaced apart from the gondola 120.

The landing module 130 is configured to be unloaded, thereby serving as the floating weight 5 when deformed from the airship to the aerostat for aerial mooring.

That is, as shown in FIG. 4A, the landing module 130 may be coupled to the gondola 120 upon landing or take off to enable the flying object 100 to slide or move, and as shown in FIG. 4B, if the landing module 130 is spaced apart from the gondola 120 to be unloaded on the ground, the buoyancy of the gasbag 110 is larger than the full load to generate a floating force, thereby enabling the stable aerial mooring.

Next, the landing module of the flying object with a landing gear module serving as a floating weight according to the present invention will be described in more detail with reference to FIGS. 5 and 6.

Figure 7:
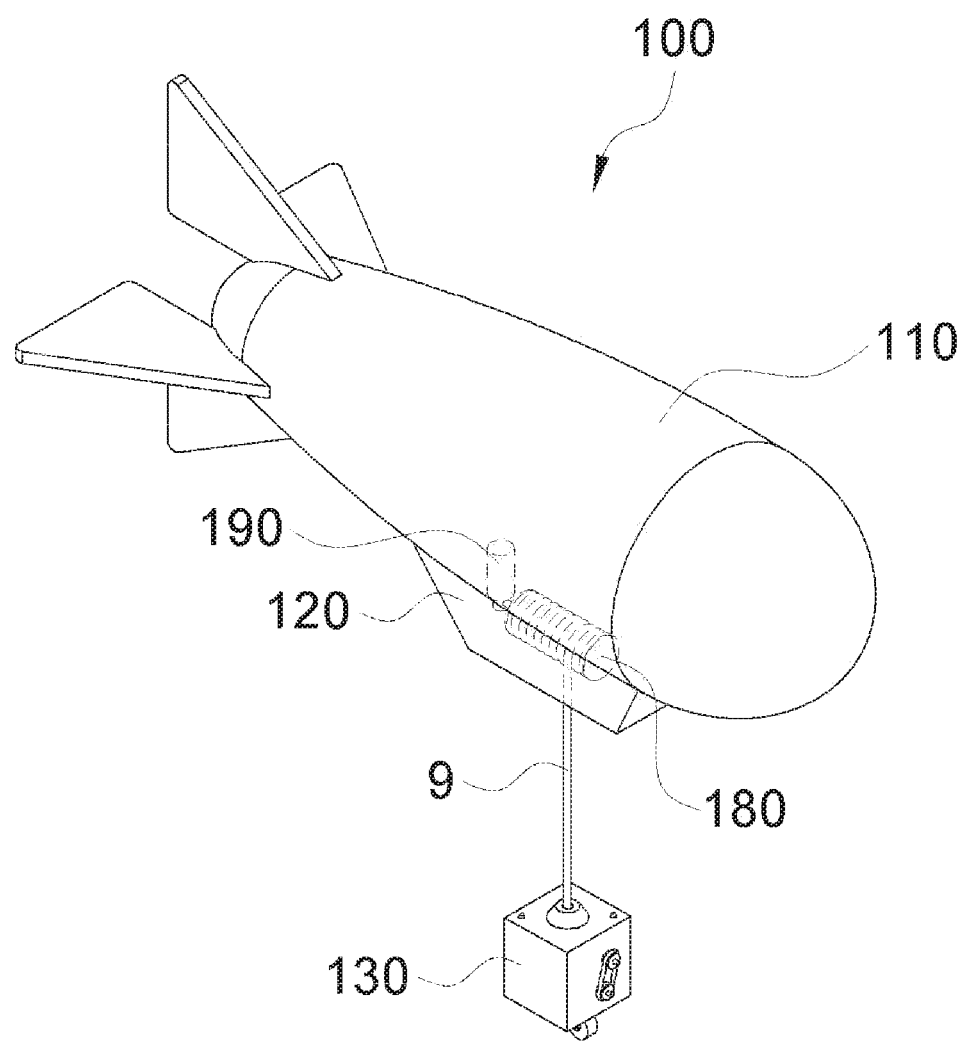
FIG. 7 is a perspective view showing a flying object with a landing gear module serving as a floating weight according to another exemplary embodiment of the present invention.

The multi-purpose landing module 130 according to the present invention includes a winding drum 180 for winding up the mooring cable 9 within a main body frame 131 and a driving motor 190 for applying a rotational force thereto, and as another embodiment, as shown in FIG. 7, the winding drum 180 and the driving motor 190 may be provided in the gondola 120.

When the mooring cable 9 is completely wound on the winding drum 180, the landing module 130 is loaded (coupled) onto the gondola 120 as shown in FIG. 4A.

On the other hand, when the mooring cable 9 wound around the winding drum 180 is completely unwound, the landing module 130 is unloaded on the ground as shown in FIG. 4B.

The driving motor 190 may further include a speed reducer 191 between the driving motor 190 and the winding drum 180.

The mooring cable 9 is drawn in from an upper side of the main body frame 131 and wound around the winding drum 180, and a front end of the winding drum 180 is further provided with a traverse 170 so that the mooring cable 9 is guided in a lateral direction to be evenly wound around the winding drum 180.

The traverse 170 includes at least a pair of guide rolls 174 to insert the mooring cable 9 between the guide rolls 174 and guide the mooring cable 9 to the winding drum 180.

The traverse 170 moves in a lateral direction by receiving a driving force transmitted by a conveying screw 171 passing through a central part of the traverse 170 and may be further provided with a guide rail 172 for moving the traverse 170 in a lateral direction to smooth the movement.

The conveying screw 171 has a shaft shape as shown in FIG. 8 and includes guide grooves 171a and 171b having a predetermined height which are provided on a surface thereof. Guide protrusions (not shown) provided on the traverse 170 are inserted into the guide grooves 171a and 171b so that when the conveying screw 171 rotates, the rotational force of the conveying screw 171 is converted into lateral movement energy of the traverse 170.

The guide grooves 171a and 171b are formed in different rotational directions from each other, and if the guide grooves 171a are used when moving to the left, different guide grooves 171b are used when moving to the right.

The conveying screw 171 continuously rotates in one direction by the driving force of the driving motor 190.

For this purpose, a driving sprocket wheel 181 is mounted at one end of a driving shaft 183 of the winding drum 180 and connected to a driven sprocket wheel 173 mounted at one end of the conveying screw 171 by a chain 182.

A sidewall 132 is used to fix the winding drum 180, the conveying screw 171, and the guide rail 172 to the main body frame 131 or rotatably fix the winding drum 180, the conveying screw 171, and the guide rail 172.

A weight body 200 may further be provided under the landing module 130 of the present invention.

The landing module 130 of the present invention must act as the floating weight, and therefore requires a heavy load having a certain weight. Accordingly, the size of the weight body 200 can be adjusted to the desired floating weight.

In the landing module 130 of the present invention, the wheel 140 is mounted on a lower part of the landing module 130 via a wheel support arm 141. The wheel support arm 141 includes a normal shock absorbing structure to absorb the shock when the flying object 100 lands on the ground.

On the other hand, the mooring cable 9 is drawn in from the upper part to the lower part of the landing module 130 of the present invention.

The landing module 130 is provided with a drawing-in structure for the drawing in, and the drawing-in structure may be a docking cone 150 as shown in FIG. 5.

The docking cone 150 has a shape in which a funnel shape is inverted and an upper part of the docking cone 150 is provided with a cone opening 151. As a result, the mooring cable 9 is drawn in through the cone opening 151 to pass through the traverse 170.

The docking cone 150 serves as a guide structure for guiding the landing module 130 to be docked at a predetermined position when the landing module 130 of the present invention is loaded (coupled) onto the gondola 120. A more detailed structure will be described below with reference to FIG. 9.

The docking cone 150 may be provided on an upper plate 133 of the landing module 130.

Meanwhile, the upper plate 133 may be further provided with docking guide protrusions 160 and 161 for more accurate and smooth docking. The docking guide protrusions 160 and 161 are each inserted into guide inserting portions 220 and 221 provided on the gondola 120 to guide the landing module 130 to be docked at a predetermined rotational position of the gondola 120 at all times.

At this time, it is possible to detect whether or not the landing module 130 is docked on the gondola 120 using a sensing sensor such as a limit switch, and stop the driving of the driving motor 190 or the winding of the mooring cable 9.

In this way, the flying object with a landing gear module serving as a floating weight can be constructed so that the flying object 100 can be moored on the ground only by unloading the landing module 130 at a desired mooring position without a separate ground fixing device and then fixing the landing module 130 to the ground.

On the other hand, as shown in FIGS. 5 and 6, the end portion C1 is provided on the mooring cable 9 and therefore may be coupled to the end portion C2 of the mooring winder 8 on the ground as in the prior art to perform the mooring. The mooring cable 9 is completely unwound from the winding drum 180 so that the landing module 130 is formed at a position where the landing gear module may be landed on the ground, and the end portion C1 is drawn into the landing module 130 when the mooring cable 9 is wound and can be configured to be wound like the mooring cable 9.

Next, the process of loading the landing module 130 of the present invention onto the gondola 120 will be described in more detail with reference to FIG. 9.

The flying object 100 of the present invention loads the landing module 130, which serves as the floating weight, onto the gondola 120 to facilitate the flight when the aerial mooring of the flying object 100 is completed and the flying object 100 is switched to the airship to move to a landing site.

When the driving motor 190 mounted on the landing module 130 is operated to rotate the winding drum 180, the mooring cable 9 is wound around the winding drum 180 and the landing module 130 rises.

The docking cone 150 provided in the landing module 130 of the present invention is fitted into the docking cone inserting portion 210 provided on the gondola 120 during the rising process and therefore the docking position is constant.

In addition, the docking guide protrusions 160 and 161 provided on the landing module 130 of the present invention are each fitted into the guide inserting portions 220 and 221 of the gondola 120 provided at the designated position, and therefore the docking direction as well as the docking position is also adjusted constantly. The docking guide protrusions 160 and 161 may have different shapes.

Next, the operation of the flying object with a landing gear module serving as a floating weight of the present invention will be described in detail with reference to FIGS. 2, 4, 5, and 9.

First, when the flying object 100 of the present invention is determined to be the aerial mooring by being assigned missions while being landed on the ground, the buoyancy generated by the gasbag 110 is adjusted to the full load of the flying object 100 to move to the mooring position with the minimum thrust energy.

Next, when the flying object 100 moves to the mooring position L3, the driving motor 190 of the landing module 130 is operated to rotate the winding drum 180 in the direction in which the mooring cable 9 is unwound.

Therefore, the landing module 130 moves to the ground while being spaced apart from the gondola 120, and when the landing module 130 reaches the ground, the landing module 130 is fixed to the ground to complete the mooring of the flying object 100.

Alternatively, the mooring winder 8 is provided at the mooring position so that the end portion C2 of the mooring winder 8 is connected to the end portion C1 of the mooring cable 9. When the end portion C1 of the mooring cable 9 and the end C2 of the mooring winder 8 on the ground are connected to each other so that if the mooring winder 8 can take charge of the tension, the landing module 130 is completely landed on the ground and therefore can be mounted.

The landing module 130 serving as the floating weight is lowered to the ground, such that the full load of the flying object 100 becomes smaller than the buoyancy of the gasbag 110 and the buoyancy is generated to generate the tension in the mooring cable 9, in which the tension is maintained by the landing module 130 fixed to the ground or by the mooring winder 8 provided on the ground.

Meanwhile, when the aerial mooring is completed and the movement of the flying object 100 is determined, the terrestrial fixing of the landing module 130 is released and the driving motor 190 of the landing module 130 rotates so that the winding drum 180 winds the mooring cable 190, or when the winding drum 180 and the driving motor 190 provided in the gondola 120 rotate to wind the mooring cable 9, the landing module 130 rises in the direction of the gondola 120 from the ground. The traverse 170 moves in a lateral direction by the driving force of the driving motor 190 during the winding process so that the mooring cable 9 can be guided to the winding drum 180 in a lateral direction to be evenly wound.

When the landing module 130 approaches the gondola 120, the docking cone 150 is fitted into the docking cone inserting portion 210 of the gondola 120 and is loaded (coupled) onto the correct position. When the docking is completed, the winding of the mooring cable 9 can be stopped by the detection of the limit switch.

The flying object with a landing gear module serving as a floating weight according to the present invention has an advantage in that the mooring process of the floating weight is simple.

In addition, the flying object with a landing gear module serving as a floating weight according to the present invention has an advantage that the floating weight unloading process can be performed stably because the landing gear module simultaneously serves as the floating weight.

In addition, the flying object with a landing gear module serving as a floating weight according to the present invention has an advantage in that the manufacturing cost is low because the landing gear module itself serves as the floating weight.

In addition, the flying object with a landing gear module serving as a floating weight according to the present invention has an advantage in that the total weight can be reduced compared to the conventional flying object.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A flying object with a landing gear module serving as a floating weight comprising:
   a gasbag;
   a gondola mounted on a lower part of the gasbag; and
   a landing module mounted on the gondola, wherein the landing module is spaced apart from the gondola to be unloaded on the ground so as to serve as a floating weight upon aerial mooring,
   wherein the landing module includes a winding drum which winds the winding cable whose one end is connected to the gondola and a driving motor applying a rotational force thereto and when the winding drum winds the mooring cable, the landing module is loaded onto the gondola, and when the mooring cable is unwound, the landing module is unloaded onto the ground,
   wherein the winding drum and the driving motor are provided in the landing module to serve as the floating weight,
   wherein a traverse is provided on a front end of the winding drum to guide the mooring cable in a lateral direction and to evenly wind the mooring cable,
   wherein a driving sprocket wheel is mounted at one end of a driving shaft of the winding drum and connected to a driven sprocket wheel mounted at one end of the conveying screw by a chain, and
   wherein the driving motor, the driving sprocket wheel, the driven sprocket wheel, and the chain are provided at the outer side of a main body frame in which the winding drum is accommodated, to be exposed to the outside.

2. The flying object of claim 1, wherein the flying object is moored by fixing the landing module to the ground in a state in which the landing module is unloaded on the ground.

3. The flying object of claim 1, further comprising:
   a speed reducer provided between the driving motor and the winding drum.

4. The flying object of claim 1, wherein the traverse moves in a lateral direction by a conveying screw passing through a central part of the traverse, the conveying screw having a shaft shape and including guide grooves having a predetermined height which are provided on a surface thereof, where guide protrusions provided on the traverse are inserted into the guide grooves so that when the conveying screw rotates, a rotational force of the conveying screw is converted into lateral movement energy of the traverse.

5. The flying object of claim 1, further comprising:
   a weight body provided on a lower part of the landing module.

6. The flying object of claim 1, wherein the winding drum and the driving motor are provided in the gondola or the landing module.

7. The flying object of claim 1, wherein the landing module is provided with a drawing-in structure for loading, and the drawing-in structure is provided on an upper part of a docking cone and is inserted into a docking cone inserting portion provided in the gondola when being loaded on the gondola so that the landing module is loaded at a constant position at all times.

8. The flying object of claim 7, wherein docking guide protrusions are provided around the docking cone above the landing module and fitted into guide inserting portions provided in the gondola to constantly adjust a docking position and a docking direction.

9. The flying object of claim 1, wherein the landing module is provided with buffering means for absorbing a shock on the ground upon landing.

10. The flying object of claim 9, wherein the buffering means is constituted by a buffer tank which is mounted on the lower part of the landing module and is made of an elastic material, and an inside of the buffer tank is filled with a buffering member.

11. The flying object of claim 9, wherein in the buffering means, a wheel is mounted on a lower part of the landing module via a wheel support arm.

12. The flying object of claim 11, wherein the wheel support arm has a structure of absorbing shock when the flying object is landed on the ground.

* * * * *